US009910687B2

(12) United States Patent
Alanis et al.

(10) Patent No.: US 9,910,687 B2
(45) Date of Patent: Mar. 6, 2018

(54) DATA FLOW AFFINITY FOR HETEROGENOUS VIRTUAL MACHINES

(71) Applicant: International Business Machines Corporation, Armonk, NY (US)

(72) Inventors: Francisco J. Alanis, Cedar Park, TX (US); Omar Cardona, Cedar Park, TX (US); Shaival J. Chokshi, Round Rock, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 380 days.

(21) Appl. No.: 14/817,433

(22) Filed: Aug. 4, 2015

(65) Prior Publication Data

US 2015/0339153 A1 Nov. 26, 2015

Related U.S. Application Data

(63) Continuation of application No. 13/775,203, filed on Feb. 24, 2013, now Pat. No. 9,110,694, which is a continuation of application No. 13/706,213, filed on Dec. 5, 2012, now Pat. No. 9,086,900.

(51) Int. Cl.
*G06F 9/455* (2006.01)

(52) U.S. Cl.
CPC .......... *G06F 9/455* (2013.01); *G06F 9/45533* (2013.01); *G06F 9/45558* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,689,723 B1 | 3/2010 | DiMambro | |
| 7,990,971 B2 | 8/2011 | Ra et al. | |
| 8,306,062 B1 | 11/2012 | Cohen | |
| 8,462,632 B1 | 6/2013 | Vincent | |
| 9,086,900 B2 | 7/2015 | Alanis et al. | |
| 2003/0058860 A1 | 3/2003 | Kunze et al. | |
| 2005/0147126 A1 | 7/2005 | Qiu et al. | |
| 2006/0209718 A1 | 9/2006 | Kinsey et al. | |

(Continued)

FOREIGN PATENT DOCUMENTS

JP 2010245943 10/2010

*Primary Examiner* — Adam Lee
(74) *Attorney, Agent, or Firm* — James L. Baudino

(57) ABSTRACT

A method and technique for data flow affinity for heterogeneous virtual machines includes: connecting first and second logical partitions to a shared virtual adapter, the first logical partition having a maximum receive unit (MRU) different than a MRU of the second logical partition; responsive to receiving data by the shared virtual adapter destined for the first or second logical partitions, performing transmission control protocol (TCP) segmentation offload processing of the data by the shared virtual adapter utilizing the MRU of the first logical partition as the transmission unit for data destined for the first logical partition and utilizing the MRU of the second logical partition as the transmission unit for data destined for the second logical partition; and disabling large receive offload (LRO) processing of data by a physical adapter if either of the first or second logical partitions does not support LRO.

12 Claims, 4 Drawing Sheets

(56) References Cited

U.S. PATENT DOCUMENTS

| | | |
|---|---|---|
| 2006/0227781 A1 | 10/2006 | Marce et al. |
| 2008/0165771 A1 | 7/2008 | Gainey et al. |
| 2008/0184224 A1 | 7/2008 | Das et al. |
| 2009/0135840 A1 | 5/2009 | Murray et al. |
| 2009/0232137 A1 | 9/2009 | Cherian et al. |
| 2010/0135324 A1 | 6/2010 | Pope et al. |
| 2010/0183009 A1 | 7/2010 | Baratakke et al. |
| 2011/0010469 A1 | 1/2011 | Kinsey et al. |
| 2011/0321039 A1 | 12/2011 | De Leon et al. |
| 2012/0057512 A1 | 3/2012 | Pecen |
| 2012/0063449 A1 | 3/2012 | Frederic et al. |
| 2013/0204965 A1 | 8/2013 | Masputra et al. |
| 2014/0157267 A1 | 6/2014 | Alanis et al. |

DATA FLOW AFFINITY FOR HETEROGENOUS VIRTUAL MACHINES

BACKGROUND

A virtual machine is a virtual sharing or partitioning of computer resources. For example, the virtually partitioned resources may include one or more processors, memory, storage, network cards, etc. Each virtual machine may run its own instance of an operating system and may run one or more applications on its operating system. The virtual machines may have separate file systems, separate users, separate applications, and separate processes. The virtual machines are generally separate, or isolated, from each other in some ways, thereby providing a look and feel like a separate server or machine from the perspective of its users. A virtual input/output (I/O) server generally provides I/O processing for the different virtual machines to bridge communications between a physical network adapter and each of the virtual machines.

BRIEF SUMMARY

According to one aspect of the present disclosure a method and technique for data flow affinity for heterogeneous virtual machines is disclosed. The method includes: connecting first and second logical partitions to a shared virtual adapter, the first logical partition having a maximum receive unit (MRU) different than a MRU of the second logical partition; responsive to receiving data by the shared virtual adapter destined for the first or second logical partitions, performing transmission control protocol (TCP) segmentation offload processing of the data by the shared virtual adapter utilizing the MRU of the first logical partition as the transmission unit for data destined for the first logical partition and utilizing the MRU of the second logical partition as the transmission unit for data destined for the second logical partition; and disabling large receive offload (LRO) processing of data by a physical adapter if either of the first or second logical partitions does not support LRO.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
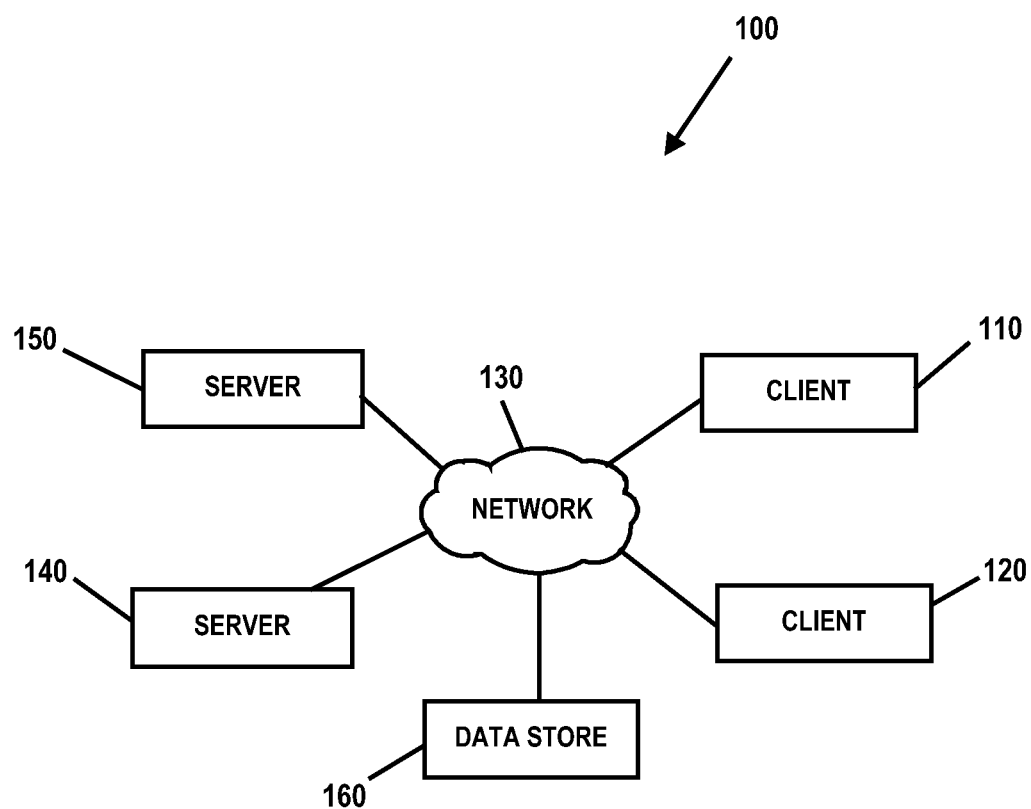
FIG. 1 is an embodiment of a network of data processing systems in which the illustrative embodiments of the present disclosure may be implemented.

Embodiments of the present disclosure provide a method and technique for data flow affinity for heterogeneous virtual machines. For example, in some embodiments, the method and technique includes: connecting first and second logical partitions to a shared virtual adapter, the first logical partition having a maximum receive unit (MRU) different than a MRU of the second logical partition; and responsive to receiving data by the shared virtual adapter destined for the first or second logical partitions, performing transmission control protocol (TCP) segmentation offload processing of the data by the shared virtual adapter utilizing the MRU of the first logical partition as the transmission unit for data destined for the first logical partition and utilizing the MRU of the second logical partition as the transmission unit for data destined for the second logical partition. Embodiments of the present disclosure enable better and/or full utilization of virtual machine bandwidth capabilities by tailoring the packet sizes destined for the respective virtual machines according to the bandwidth capacity of the respective virtual machines. For example, embodiments of the present disclosure utilize a shared virtual adapter to custom-fit the packet sizes communicated to a respective virtual machine based on the maximum receive unit (MRU) of the respective virtual machine. The shared virtual adapter is configured to perform software-based large receive offload (LRO) processing of the incoming data packets based on the MRU for the virtual machine destination. The aggregated data packets may then be communicated to the virtual machine destination (e.g., using transmission control protocol (TCP) segmentation offload (TSO) processing) using the MRU for the respective virtual machine as the transmission unit.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
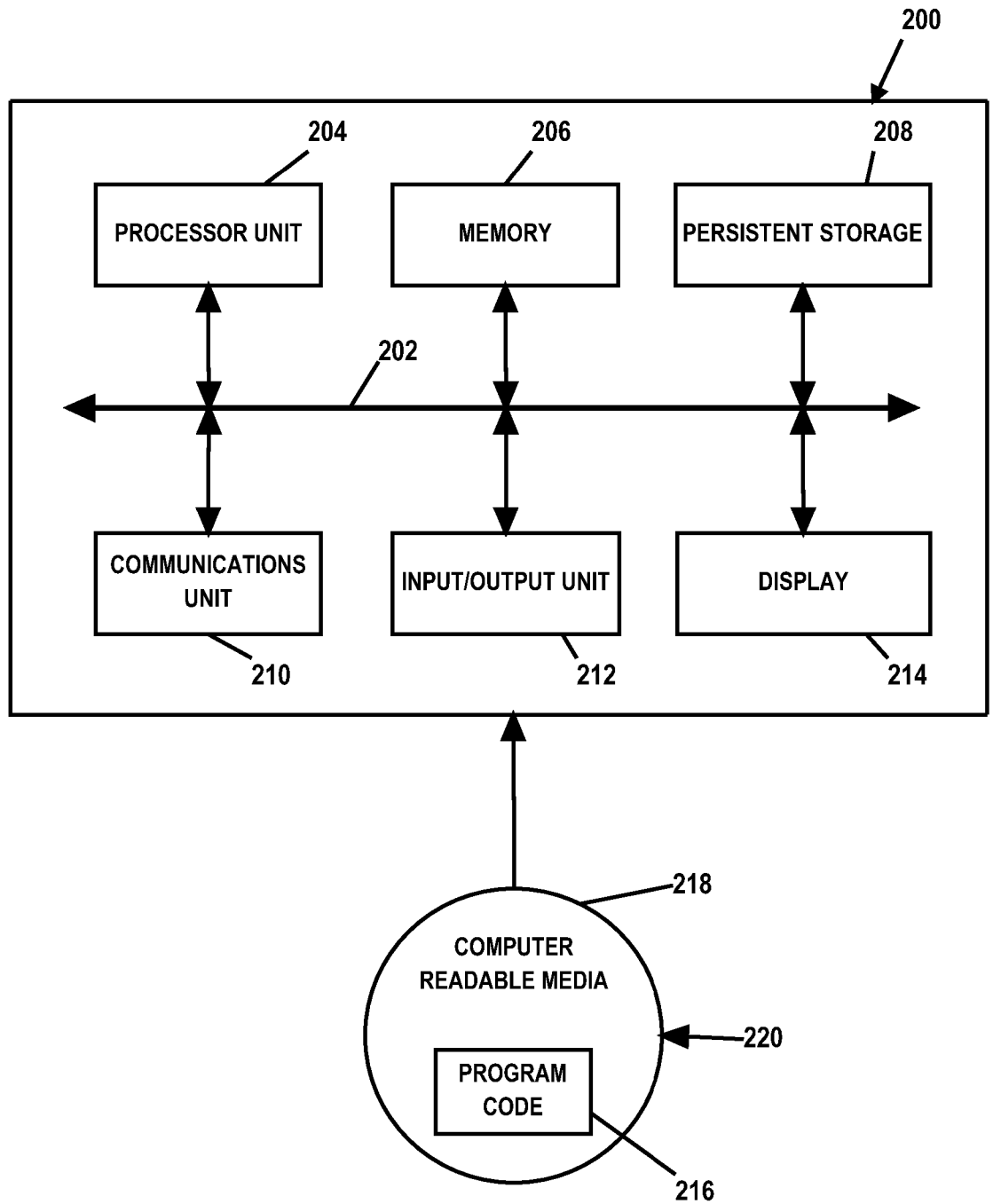
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System P® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for data flow affinity for heterogeneous virtual machines according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
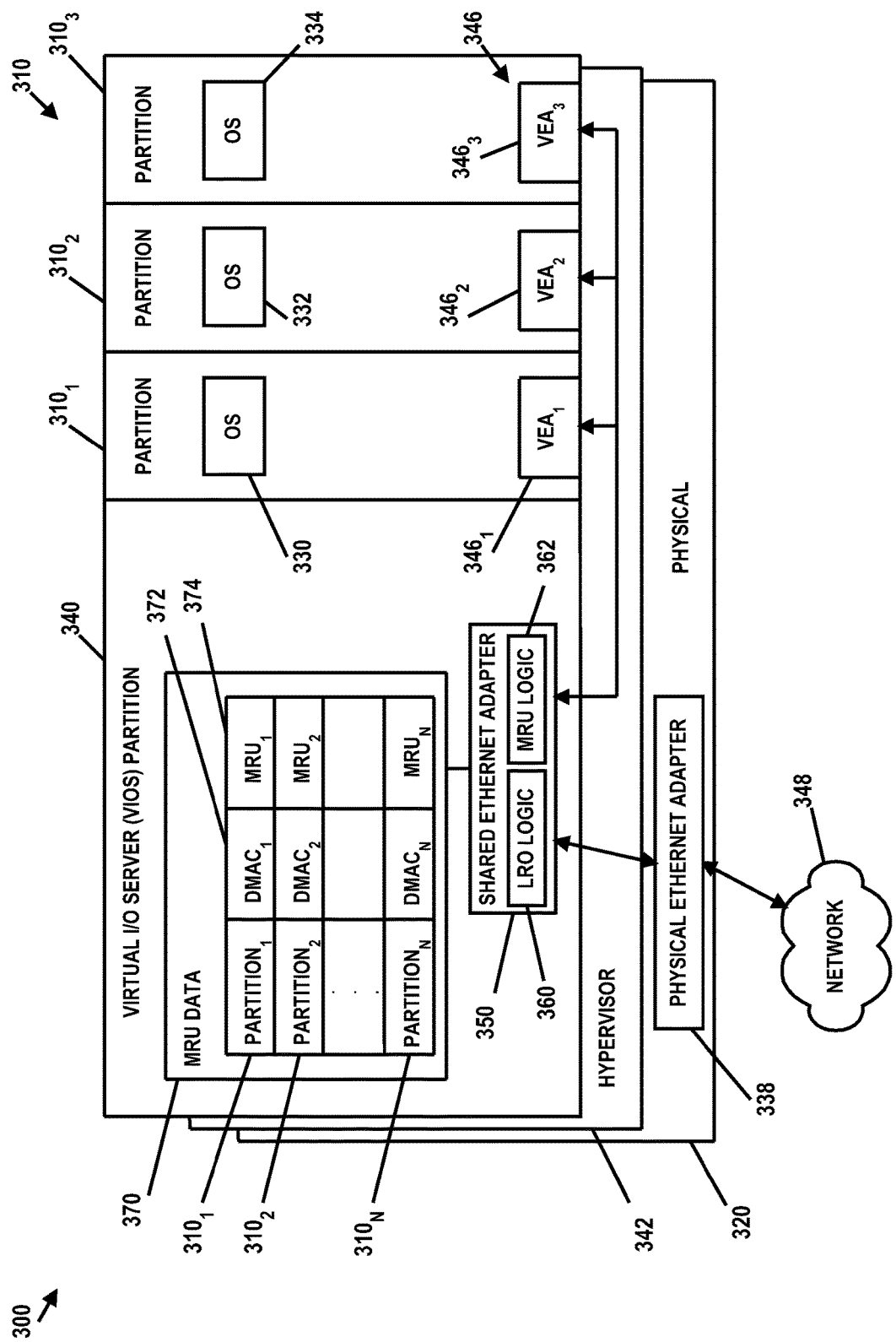
FIG. 3 is a diagram illustrating an embodiment of a data processing system for data flow affinity for heterogeneous virtual machines in which illustrative embodiments of the present disclosure may be implemented.

FIG. 3 is an illustrative embodiment of a system 300 for data flow affinity for heterogeneous virtual machines. System 300 may be implemented on data processing systems or platforms such as, but not limited to, servers 140 and/or 150, clients 110 and/or 120, or at other data processing system locations. In the embodiment illustrated in FIG. 3, processors, memory, and other hardware resources of computer system 300 may be apportioned into logical partitions (LPARs) 310 that may operate independently, each LPAR 310 running its own operating system and applications. In the illustrated embodiment, LPARs 310 include LPARs $310_1$, $310_2$ and $310_3$; however, it should be understood that a greater or fewer quantity of LPARs 310 may be provisioned. LPARs are assigned a subset of a computer's physical layer hardware resources 320 (i.e., a subset of the hardware underlying the server environment) and are virtualized within the server environment as a separate computer/virtual machine. Resources such as processor capacity, memory, or any other type of resource may be assigned to a particular LPAR. Each LPAR has its own virtual operating system (OS) instance (e.g., operating systems 330, 332 and 334 in respective LPARs $310_1$, $310_2$ and $310_3$) and associated files, allowing for multiple operating systems to be simultaneously executing within the server environment.

In the embodiment illustrated in FIG. 3, a physical input/output (I/O) adapter 338 in physical layer 320 is assigned/configured to be shared by a plurality of LPARs 310 via an LPAR 340 that is dedicated to implementing I/O functionality by executing virtual I/O server (VIOS) software. The LPAR 340 running the VIOS software may be referred to herein as a VIOS LPAR or VIOS partition 340. Likewise, the executing VIOS software, which provides VIOS functionality, may be referred to herein as a VIOS. Logical partitioning is facilitated by software 342 (a "hypervisor") that controls the computer system's hardware and monitors the operating systems of the LPARs. Hypervisor 342 operates at a level between the logical partition operating systems level and computer system 300 hardware at a physical layer 320. Hypervisor 342 may run directly on the computer system's hardware 320 or within a conventional operating system environment, depending upon the implementation.

One way of enabling Internet protocol-based communication among LPARs within the same computer system is by software-based, virtual adapters 346 (e.g., virtual Ethernet adapters) provided by hypervisor 342. Virtual adapters are provided for LPARs $310_1$, $310_2$ and $310_3$ (referred to as $VEA_1$ $346_1$, $VEA_2$ $346_2$ and $VEA_3$ $346_3$, respectively, in FIG. 3). In the illustrated embodiment, the VIOS also enables logical partitions to also communicate with external (i.e., remote) computer systems over a communication network 348 using a virtual, shared adapter 350 (e.g., a virtual shared Ethernet adapter), functionality for which is provided by the operating system of VIOS LPAR 340. Adapter 350 may be software that runs on VIOS LPAR 340 and that bridges: i) a real (i.e., physical) adapter 338 (e.g., an Ethernet adapter), which is coupled to an external network 348 of computer systems; and ii) one or more virtual adapters 346 for LPARs 310. Using a shared virtual adapter 350 in the VIOS LPAR 340, LPARs 310 share access to the physical network and communicate with external computer systems and logical partitions on those computer systems.

In some embodiments, some LPARs 310 may have different data receiving properties depending on the operating system running on the particular LPAR 310, thereby resulting in a heterogeneous virtual machine environment. For example, OS 330 may have a maximum receive unit (MRU)

of 64 KB (e.g., when software-based large receive offload (LRO) is enabled), while OS 332 may not support software-based LRO (e.g., having a MRU of 9 KB). LRO is a technique for increasing inbound throughput of network connections by aggregating multiple incoming packets into a buffer before passing the data onward. OS 334 may also have a different MRU. Typically, to accommodate different MRUs between different LPARs, a lowest common MRU may be used to communicate data from adapter 350 to LPARS 310. Embodiments of the present disclosure enable a LPAR's bandwidth to be better/fully utilized by custom-fitting the data packet sizes according to the LPAR 310 capabilities.

In the embodiment illustrated in FIG. 3, adapter 350 includes LRO logic 360 and MRU logic 362. LRO logic and MRU logic 362 are configured to accommodate differing data packet receiving properties corresponding to different LPARs 310. LRO logic 360 and/or MRU logic 362 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). In some embodiments, MRU logic 362 is configured to determine/identify a MRU for a particular LPAR 310 such that LRO logic 360 may perform large receive offload processing of the incoming data packets up to the MRU for a respective LPAR 310. LRO logic 360 may then perform transmission control protocol (TCP) segmentation offload (TSO) processing of the data packets to a respective LPAR 310 using the MRU as the transmission unit.

In some embodiments, LRO may be disabled in physical adapter 338 (e.g., by a user/administrator or by logic 360/362) to prevent LRO data processing in connection with LPARs not supporting LRO. To connect a particular LPAR 310 to adapter 350, an address resolution protocol (ARP) exchange is implemented/performed between adapter 350 and a respective virtual adapter 346 for the respective LPAR 310 to determine/assign a particular media access control (MAC) address to the respective virtual adapter 346 internet protocol (IP) address. In some embodiments, an extra flag/field is included in the ARP response packet from the respective virtual adapter 346 indicating the MRU for the respective LPAR 310. During the ARP message exchange, adapter 350 is configured to parse the ARP response packet(s) and read the designated MRU flag/field to identify the MRU for the respective LPAR 310 (e.g., via logic 360). However, it should be understood that other methods may be used to identify the MRU for a particular LPAR 310 (e.g., based on an identification of the operating system running in the particular LPAR 310, data stored by hypervisor 342 upon LPAR 310 provisioning, etc.). Logic 360 of adapter 350 may then store the MRU for each respective LPAR 310 as MRU data 370 (e.g., as a relational database or otherwise). For example, in the illustrated embodiment, MRU data 370 includes a destination MAC address (DMAC) 372 for each respective LPAR 310 (e.g., $DMAC_1$ for $LPAR\ 310_1$, $DMAC_2$ for $LPAR\ 310_2$, etc.). MRU data 370 also includes the MRU 374 for each respective LPAR 310 (e.g., $MRU_1$ for $LPAR\ 310_1$, $MRU_2$ for $LPAR\ 310_2$, etc.).

In response to adapter 350 receiving incoming data packets, adapter 350 parses the incoming data packets to determine a destination address (DMAC) for the respective data packets. In response to adapter 350 identifying the destination address(es) for the incoming data packets as corresponding to a particular LPAR 310 connected to adapter 350, adapter 350 accesses MRU data 370 (e.g., via logic 360) to identify/determine a MRU for the respective destination LPAR 310. Adapter 350 then performs LRO processing of the data packets by aggregating the data packets destined for a particular LPAR 310 up to the MRU for the respective destination LPAR 310 via LRO logic 360 and forwards the data packets to the destination LPAR 310 using TSO using the identified MRU as the transmission unit in the transfer operation.

Figure 4:
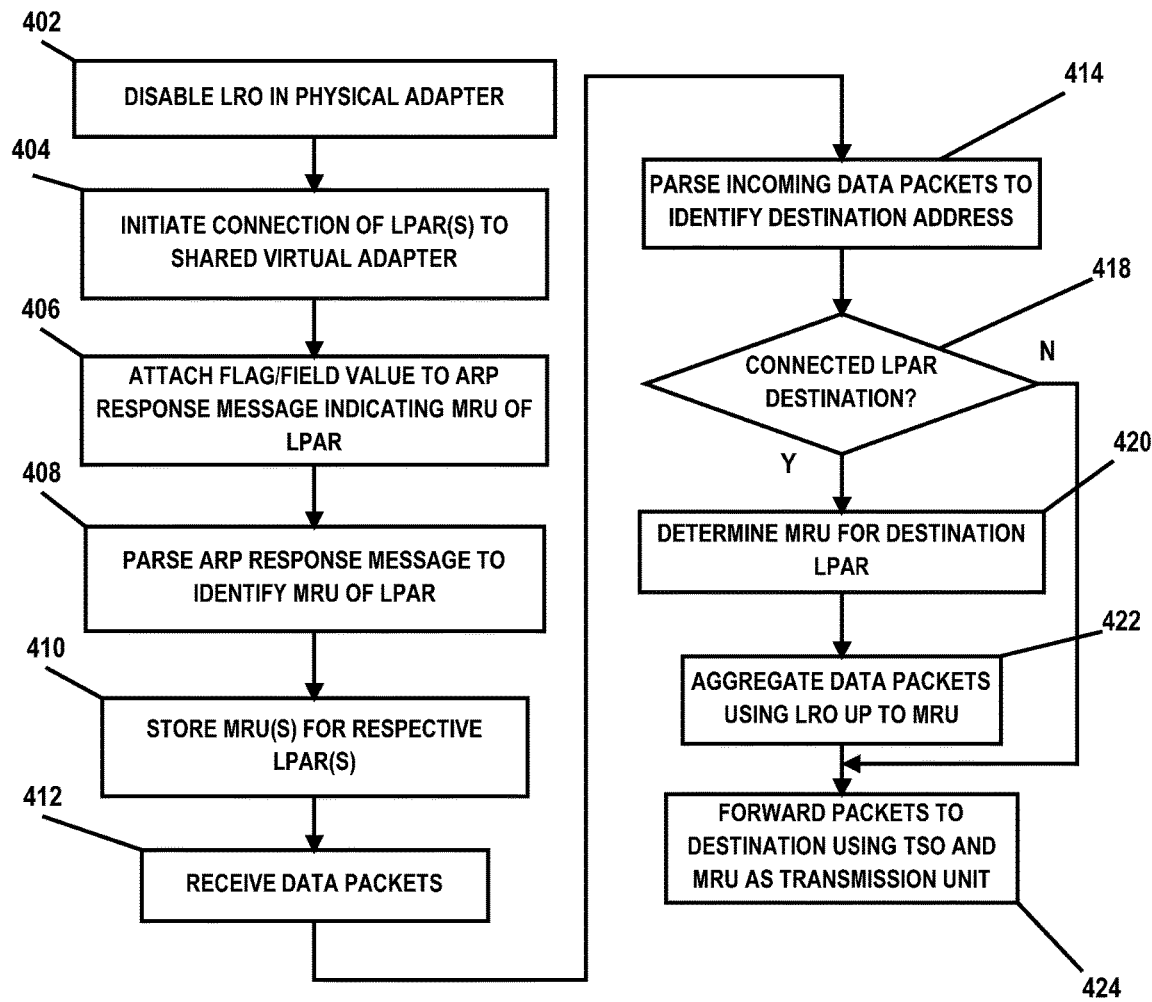
FIG. 4 is a flow diagram illustrating an embodiment of a method for data flow affinity for heterogeneous virtual machines according to the present disclosure.

FIG. 4 is a flow diagram illustrating an embodiment of a method for data flow affinity for heterogeneous virtual machines. The method begins at block 402, where LRO is disabled in physical adapter 338. At block 404, connection of one or more LPARs 310 to shared virtual adapter 350 is initiated. At block 406, the MRU value for a respective LPAR 310 connecting with shared virtual adapter 350 through an ARP communication exchange is attached/included in an ARP response packet. At block 408, the shared virtual adapter 350 parses the ARP response packet and identifies the MRU for the respective LPAR 310. At block 410, shared virtual adapter 350 stores the MRU value for the respective LPAR 310 correlated to the MAC address of the respective LPAR 310.

At block 412, shared virtual adapter 350 receives incoming data packets (e.g., from network 348). At block 414, shared virtual adapter 350 parses the incoming data packets to identify a destination address for the communications. At decisional block 418, a determination is made by shared virtual adapter 350 (e.g., via MRU logic 362) whether the identified destination address for the incoming data packets corresponds to an LPAR 310 connected to shared virtual adapter 350. For example, MRU logic 362 may be configured to compare the destination address parsed from the incoming data packets with information stored as MRU data 370 to determine whether MRU data 370 reflects a corresponding/matching MAC address. If not, the method proceeds to block 424, where the incoming data packets may be forwarded/transmitted the indicated destination using TSO or other applicable protocol. If it is determined at decisional block 418 that the destination address parsed from the incoming data packets matches a MAC address stored as MRU data 370, the method proceeds to block 420, where MRU logic 362 acquires and/or otherwise identifies the MRU for the LPAR 310 with the matching MAC address. At block 422, LRO logic 360 of shared virtual adapter 350 performs LRO aggregation and buffering of the incoming data packets up to the identified MRU for the destination LPAR 310. The method then proceeds to block 424, where the aggregated data packets are forwarded to the destination LPAR 310 using TSO and using the identified MRU for the destination LPAR 310 as the transmission unit.

Thus, embodiments of the present disclosure enable better utilization of virtual machine bandwidth capabilities by tailoring the packet sizes destined to MAC addresses of the virtual machines to meet the capacity of the respective virtual machines. For example, embodiments of the present disclosure utilize a shared virtual adapter to custom-fit the packet sizes communicated to a respective virtual machine based on the MRU of the respective virtual machine. The shared virtual adapter is configured to perform LRO processing of the incoming data packets based on the MRU for the virtual machine destination. The aggregated data packets may then be communicated to the virtual machine destination (e.g., using TSO processing) using the MRU for the respective virtual machine as the transmission unit.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
  connecting first and second logical partitions to a shared virtual adapter, the first logical partition having a maximum receive unit (MRU) different than a MRU of the second logical partition;
  responsive to receiving data by the shared virtual adapter destined for the first or second logical partitions, performing transmission control protocol (TCP) segmentation offload processing of the data by the shared virtual adapter utilizing the MRU of the first logical partition as the transmission unit for data destined for the first logical partition and utilizing the MRU of the second logical partition as the transmission unit for data destined for the second logical partition; and
  disabling large receive offload (LRO) processing of data by a physical adapter if either of the first or second logical partitions does not support LRO.

2. The method of claim 1, further comprising, responsive to connecting of the first and second logical partitions to the shared virtual adapter, identifying the MRU for the respective first and second logical partitions.

3. The method of claim 1, further comprising aggregating, by the shared virtual adapter, incoming packets of the data up to the respective MRU.

4. The method of claim 1, further comprising storing, by the shared virtual adapter, the MRU corresponding to the first and second logical partitions.

5. A system, comprising:
  a physical input/output (I/O) adapter;
  a hypervisor operable to manage a virtualized environment comprising first and second logical partitions, the first logical partition having a maximum receive unit (MRU) different than a MRU of the second logical partition; and
  a virtual input/output server (VIOS) having a shared virtual adapter connected to the first and second logical partitions, the shared virtual adapter configured to, responsive to receiving data via the physical I/O adapter destined for the first or second logical partitions, perform transmission control protocol (TCP) segmentation offload processing of the data utilizing the MRU of the first logical partition as the transmission unit for data destined for the first logical partition and utilizing the MRU of the second logical partition as the transmission unit for data destined for the second logical partition, and wherein large receive offload (LRO) processing of data by the physical adapter is disabled if either of the first or second logical partitions does not support LRO.

6. The system of claim 5, wherein the shared virtual adapter is operable to, responsive to a connection of the respective first and second logical partitions to the shared virtual adapter, identify the MRU for the respective first and second logical partitions.

7. The system of claim 6, wherein the shared virtual adapter is operable to aggregate incoming packets of the data up to the respective MRU.

8. The system of claim 5, wherein the shared virtual adapter is operable to store the MRU corresponding to the first and second logical partition.

9. A computer program product for data flow affinity for heterogeneous virtual machines, the computer program product comprising:
  a non-transitory computer readable medium having computer readable program code embodied therewith, the computer readable program code comprising computer readable program code configured to:
    connect first and second logical partitions to a shared virtual adapter, the first logical partition having a maximum receive unit (MRU) different than a MRU of the second logical partition;
    responsive to receiving data by the shared virtual adapter destined for the first or second logical partitions, perform transmission control protocol (TCP) segmentation offload processing of the data utilizing the MRU of the first logical partition as the transmission unit for data destined for the first logical partition and utilizing the MRU of the second logical partition as the transmission unit for data destined for the second logical partition; and
    disable large receive offload (LRO) processing of data by a physical adapter if either of the first or second logical partitions does not support LRO.

10. The computer program product of claim 9, wherein the computer readable program code is configured to, responsive to a connection of the first and second logical partitions to the shared virtual adapter, identify the MRU for the respective first and second logical partitions.

11. The computer program product of claim 9, wherein the computer readable program code is configured to aggregate incoming packets of the data up to the respective MRU.

12. The computer program product of claim 9, wherein the computer readable program code is configured to store the MRU corresponding to the respective first and second logical partitions.

* * * * *